E. E. HUDSON & D. ELMES.
PRIMARY BATTERY.
APPLICATION FILED SEPT. 19, 1910.

1,061,541.

Patented May 13, 1913.

Witnesses:
Robert M. Sutphen
Dyer Smith

Inventors:
Elisha E. Hudson and
Dawson Elmes
by Frank T. Brown
Their Atty.

UNITED STATES PATENT OFFICE.

ELISHA E. HUDSON, OF NEWARK, AND DEVEREUX ELMES, OF ORANGE, NEW JERSEY, ASSIGNORS, BY MESNE ASSIGNMENTS, TO THOMAS A. EDISON, INCORPORATED, OF WEST ORANGE, NEW JERSEY, A CORPORATION OF NEW JERSEY.

PRIMARY BATTERY.

1,061,541.   Specification of Letters Patent.   Patented May 13, 1913.

Application filed September 19, 1910. Serial No. 582,608.

*To all whom it may concern:*

Be it known that we, ELISHA E. HUDSON, a citizen of the United States, and a resident of Newark, in the county of Essex and State of New Jersey, and DEVEREUX ELMES, a citizen of the United States, and a resident of Orange, in the county of Essex and State of New Jersey, have invented certain new and useful Improvements in Primary Batteries, of which the following is a description.

Our invention relates to primary batteries, and the object thereof is to provide an electrode plate for such batteries furnished with means for giving advance indication to the user of the approaching exhaustion of the plate, so that he may be prepared to renew the same.

Our invention relates particularly to primary batteries of that class in which the negative electrode consists in a plate of oxid of copper or other depolarizing agent and the positive electrode consists of a plate or plates of zinc. A battery of this character is described in patent to Dodge No. 894,487 for primary batteries, granted July 28, 1908. In a battery of this character, the positive plates wear away during the electrolytic action quite evenly.

The indicating means contemplated by our invention consists in forming a small depression on the side of a positive plate farthest away from the negative plate with which it coacts in the battery. When the positive plate has been worn by the electrolytic action of the cell sufficiently thin, it will wear through in one or more small holes in the depressed portion of the plate, thereby indicating to the user that the plate will have to be renewed shortly, say in from two to four weeks' time. Preferably, we make the small depression of a circular shape and surround the same with a raised rim for locating the spot which the user should watch for signs of wear. Other means may, however, be used to mark the depressed portion of the plate if desired, as will be obvious.

Our invention is not limited to batteries of the class described, but is applicable to any batteries using plates which wear away more or less evenly under the action of the electrolyte.

In order that our invention may be more clearly understood, attention is hereby directed to the accompanying drawings forming part of this specification, in which—

Figure 1:
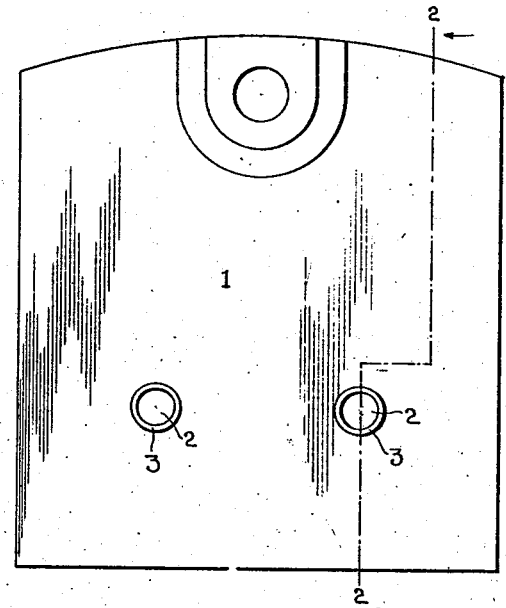
Figure 2:
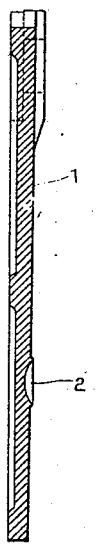
Figure 3:
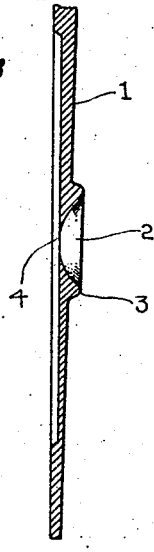

Figure 1 represents a side elevation of the positive electrode plate equipped with our invention. Fig. 2 is a section of the same taken on line 2—2 of Fig. 1; and Fig. 3 is an enlarged cross sectional detail of a portion of an electrode plate which has worn through the indicating depression.

Referring to the drawings, the electrode plate 1 is provided with one or two or more depressed portions 2 which are preferably circular and slightly concave. The depth of these depressions need only be very slight. Depressions 2 are surrounded by annular flanges 3. In Fig. 3 the electrode plate 1 has worn sufficiently thin to give advance indication that it must shortly be replaced, by the appearance of the hole 4 in the center of the depressed portion 2 thereof.

Having now described our invention, what we claim and desire to protect by Letters Patent is as follows:—

1. In a primary battery, a positive plate having a depression of small area on the side farthest away from the negative element with which it coacts, for indicating the approaching necessity for renewal, substantially as described.

2. In a primary battery, a positive plate having a small circular depression on the side farthest away from the negative element with which it coacts, to indicate the approaching necessity for renewal of the plate after sufficient service in the battery, by the appearance of a hole through the same, substantially as described.

3. As a new article of manufacture, an electrode plate for a voltaic battery comprising a flat plate having means for indicating visually the approaching necessity for renewal of the plate when the latter has worn thin in use in a voltaic battery, comprising a small depression in one surface of the plate surrounded by a raised rim, substantially as described.

4. As a new article of manufacture, an electrode plate for a voltaic battery comprising a flat plate having means for indicating visually the approaching necessity for renewal of the plate when the latter has worn thin in use in a voltaic battery, comprising a small depression in one surface of the plate and means for indicating the location of the depression, substantially as described.

5. In a primary battery, a removable positive plate having a small portion thereof of reduced thickness, in which portion the plate is adapted first to wear through in the operation of the battery to indicate a predetermined extent of consumption of the plate, substantially as described.

This specification signed and witnessed at West Orange, Essex county, New Jersey, this 15th day of September, 1910.

ELISHA E. HUDSON.
DEVEREUX ELMES.

Witnesses:
DYER SMITH,
ANNA R. KLEHM.